J. BUEB.
METHOD OF MAKING AMMONIUM CARBONATE.
APPLICATION FILED SEPT. 21, 1910.

1,004,361. Patented Sept. 26, 1911.

UNITED STATES PATENT OFFICE.

JULIUS BUEB, OF DESSAU, GERMANY.

METHOD OF MAKING AMMONIUM CARBONATE.

1,004,361.        Specification of Letters Patent.        Patented Sept. 26, 1911.

Application filed September 21, 1910. Serial No. 583,057.

*To all whom it may concern:*

Be it known that I, JULIUS BUEB, a subject of the German Emperor, and resident of Dessau, Germany, have invented certain new and useful Improvements in the Method of Making Ammonium Carbonate, of which the following is a specification.

The present invention is in close proximity with the process for which U. S. patent was applied for on the 12th of April 1910 Ser. No. 555,034 and which consists briefly in making ammonium carbonate by causing gaseous ammonia, carbon dioxid and steam to act upon each other at a temperature above the temperature of decomposition of ammonium carbonate, the said temperature being effected by causing the ammonia, carbon dioxid and steam to pass together through an externally heated tube. Now I have found that the reaction in question is effected in a more simple manner by leading the carbon dioxid or the ammonia or both through water which is heated to a temperature of 58 to 100° centigrade. A form of apparatus suitable for working according to this modification is illustrated in the accompanying drawings.

Figure 1:
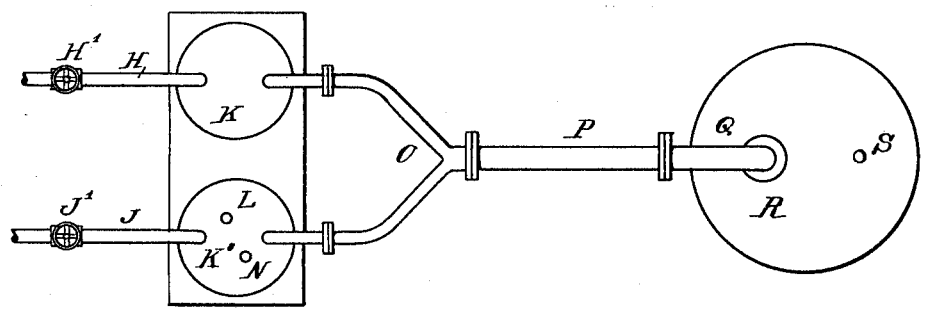
Figure 2:
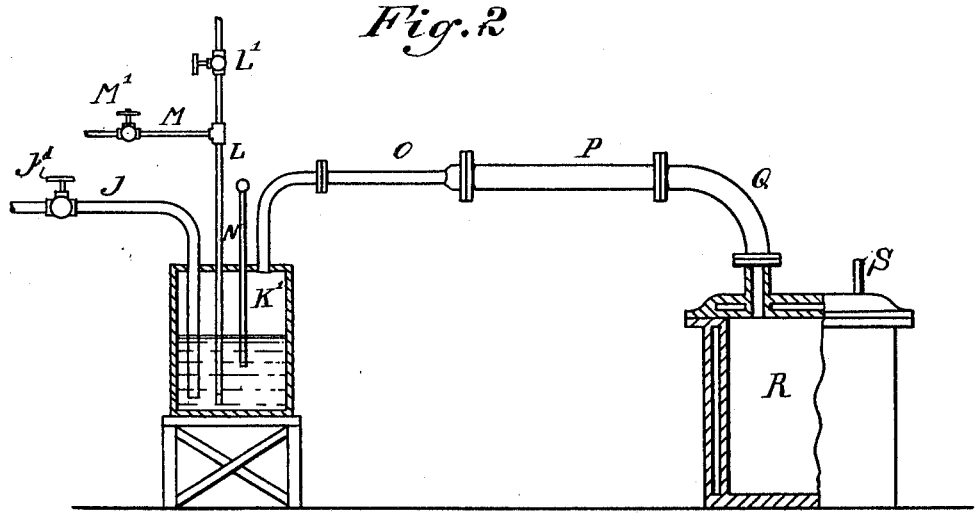

Figure 1 is a plan and Fig. 2 an elevation, partly in section, in which:

H is a supply pipe for the gaseous ammonia, controlled by valve H', and J is a supply pipe for carbon dioxid, controlled by valve J'.

K and K' are gas moistening, or wash, bottles; L is a steam pipe, controlled by the valve L', for maintaining the temperature of the water in K' at the desired point.

M is a water line, controlled by the valve M', for replenishing the water in K' as it is used.

N is a thermometer for regulating the temperature of the water in K'.

O is a branched connection from the wash bottles K, K' to the mixing tube P.

Q is a connecting pipe from the mixing tube P to the water jacketed subliming chamber R, which is provided with the vent S.

In order to make my present application more clear, and complete in itself, I will repeat a part of the specification No. 555,034 as follows:

The process takes place in such a manner that the gases in the heated mixture act upon each other, but ammonium carbonate is not yet deposited, as its decomposing temperature lies, as is well known, above 60° centigrade. The formation and precipitation of solid ammonium carbonate takes place, however, immediately the gases enter the subliming chamber and become cooled to below 60° centigrade, the ammonium carbonate then depositing in thick crusts on the walls and cooling surfaces.

In the practical operation of the process it has been found that the quantity of steam used is inversely proportional to the ammonia contents of the salt obtained. It is accordingly possible to vary the ammonia contents of the ammonium carbonate to be prepared by a corresponding regulation of the steam supply. The amount of carbon dioxid in the salt does not vary greatly from about 56 per cent., whereas the amount of ammonia ranges between about 20 and 40 per cent. If, for instance, ammonia and carbon dioxid be subjected to the action of but very little steam, a very highly valuable salt is obtained which contains above 40 per cent. of ammonia. By increasing the amount of steam relatively to the amount of ammonia, it is possible to produce salts containing a proportionately less and less percentage of ammonia, so that a content in ammonia of nearly as little as 20 per cent. can be obtained. As an illustration of this fact I give below some reactions showing products containing varying amounts of ammonia, but it must be understood, that wherever the term "ammonium carbonate" is used in this application it is employed according to the commercial, or trade, interpretation, and embraces all products of ammonia, carbon dioxid and water, or mixtures of such products:

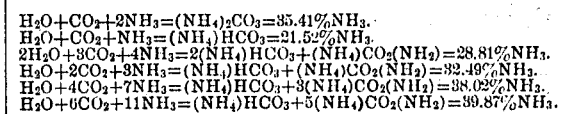

In carrying out my improved process I proceed as follows: Carbon dioxid is caused to pass through the gas moistening, or wash, bottle K'; at the same time steam is admitted into K' through the pipe L in such quantity as to maintain the temperature of the water in K' at any point desired between 50° and 100° centigrade. By the passage of the carbon dioxid through the hot water it is heated to the necessary temperature and, in addition, carries with it abundant steam, the latent heat of which also enters into effect during the reaction. Gaseous ammonia is caused to pass through the pipe H and the wash bottle K, which usually is cold, but may be heated in a manner similar to K' if desired. The gaseous ammonia, hot carbon dioxid and water vapor pass from the bottles K, K' through the branched pipe O into the mixing tube P where they react together, the hot mixture then passing through the connection Q into the cooled sublimate chamber R where the ammonium carbonate is precipitated.

By regulating the temperature of the water, through which the carbon dioxid is caused to pass, it is possible to regulate the quantity of steam according to the percentage of ammonia desired in the carbonate of ammonia obtained. Of course instead of the carbon dioxid the ammonia, or a mixture of both, can be caused to pass through the hot water.

I do not confine myself to the foregoing specific method of operation, but what I claim is:—

1. A method of making ammonium carbonate by the reaction of gaseous ammonia, carbon dioxid and steam which consists in passing at least one of said gases through hot water, thereby preheating the same, and thereafter causing the said gases to react upon each other.

2. A method of making ammonium carbonate by the reaction of gaseous ammonia, carbon dioxid and steam which consists in passing at least one of said gases through hot water, thereby preheating the same, thereafter causing the said gases to react upon each other, and replenishing the hot water as it is used.

3. A method of making ammonium carbonate by the reaction of gaseous ammonia, carbon dioxid and steam which consists in passing carbon dioxid through hot water thereby preheating it and causing the said gases to react upon each other.

4. A method of making ammonium carbonate by the reaction of gaseous ammonia, carbon dioxid and steam which consists in passing carbon dioxid through hot water thereby preheating it, causing the said gases to react upon each other, and cooling the hot mixture.

5. A method of making ammonium carbonate by the reaction of gaseous ammonia, carbon dioxid and steam, which consists in passing carbon dioxid through hot water, thereby preheating it, passing gaseous ammonia through hot water, thereby preheating it, and causing the preheated carbon dioxid, the preheated ammonia, and the steam to react upon each other.

6. A method of making ammonium carbonate by the reaction of gaseous ammonia, carbon dioxid and steam, which consists in passing carbon dioxid through hot water, thereby preheating it, passing gaseous ammonia through hot water, thereby preheating it, causing the preheated carbon dioxid, the preheated ammonia and the steam to react upon each other, and cooling the hot mixture.

7. The herein described method of making ammonium carbonate by the reaction of gaseous ammonia, carbon dioxid and steam which consists in passing at least one of said gases through hot water, thereby preheating the same, thereafter causing the said gases to react upon each other while at a temperature above that of decomposition of ammonium carbonate, and cooling the mixture.

8. The herein described method of making ammonium carbonate by the reaction of gaseous ammonia, carbon dioxid and steam which consists in passing carbon dioxid through hot water thereby preheating it to a temperature above that of decomposition of ammonium carbonate, thereafter causing the said gases to react upon each other, and cooling the mixture.

9. The herein described method of making ammonium carbonate by the reaction of gaseous ammonia, carbon dioxid and steam which consists in passing at least one of said gases and steam through water to preheat said gas, thereafter causing the gases to react upon each other while at a temperature above that of decomposition of ammonium carbonate, and cooling the mixture.

In testimony whereof I have signed my name to this specification in the presence of two subscribing witnesses.

JULIUS BUEB.

Witnesses:
RUDOLPH FRICKE,
ALBERT R. MORAWETZ.